(12) United States Patent
Sichello

(10) Patent No.: US 9,004,298 B2
(45) Date of Patent: Apr. 14, 2015

(54) INTERLOCKING PLANT PROPAGATION AND DISPLAY TRAY AND METHOD OF USE AND ASSEMBLY

(75) Inventor: Chad Sichello, Delta (CA)

(73) Assignee: GSKY—Plant System Inc. (CA)

( * ) Notice: Subject to any disclaimer, the term of this patent is extended or adjusted under 35 U.S.C. 154(b) by 0 days.

(21) Appl. No.: 13/362,954

(22) Filed: Jan. 31, 2012

(65) Prior Publication Data

US 2012/0298599 A1 Nov. 29, 2012

Related U.S. Application Data

(60) Provisional application No. 61/438,150, filed on Jan. 31, 2011.

(51) Int. Cl.
*A47G 29/00* (2006.01)
*A01G 9/02* (2006.01)

(52) U.S. Cl.
CPC ....................................... *A01G 9/025* (2013.01)

(58) Field of Classification Search
CPC .. A01G 27/001; A01G 27/003; A01G 27/005
USPC .............. 211/71.01, 72, 73, 75, 85.23, 87.01, 211/88.03, 90.01, 59.2, 153, 126.2; 47/66.1, 66.5, 66.6, 79, 82, 83, 86
See application file for complete search history.

(56) References Cited

U.S. PATENT DOCUMENTS

| | | | |
|---|---|---|---|
| 2,915,162 A * | 12/1959 | Umstead ......................... | 193/27 |
| 3,207,321 A * | 9/1965 | Joyce ......................... | 211/126.5 |
| 3,422,961 A * | 1/1969 | Mayhew et al. ............... | 211/153 |
| 4,131,203 A * | 12/1978 | Bridges ........................ | 211/88.01 |
| 4,294,363 A * | 10/1981 | Oztekin et al. ................ | 211/59.2 |
| 4,295,296 A * | 10/1981 | Kinghorn ........................... | 47/82 |
| 4,887,388 A * | 12/1989 | Waltel, Jr. ......................... | 47/79 |
| 4,953,719 A * | 9/1990 | Spamer ......................... | 211/188 |
| 5,031,780 A * | 7/1991 | Lemmerman et al. ..... | 211/41.12 |
| 5,595,310 A * | 1/1997 | Spamer et al. ................ | 211/59.2 |
| 5,826,375 A * | 10/1998 | Black ................................. | 47/67 |
| 6,253,898 B1* | 7/2001 | O'Brien .......................... | 193/38 |
| 6,840,008 B1* | 1/2005 | Bullock et al. ..................... | 47/82 |
| 7,627,983 B1* | 12/2009 | Deutsch-Aboulmahassine ............. | 47/83 |
| 2006/0043038 A1* | 3/2006 | Wetzel et al. ............... | 211/88.03 |
| 2009/0000189 A1* | 1/2009 | Black ................................. | 47/82 |
| 2009/0211154 A1* | 8/2009 | DiMaggio ........................... | 47/83 |

(Continued)

FOREIGN PATENT DOCUMENTS

DE 3420037 A * 12/1985
GB 2087701 A * 6/1982

*Primary Examiner* — Korie H Chan
(74) *Attorney, Agent, or Firm* — Mayback & Hoffman, P.A.; Gregory L. Mayback; Thomas Bethea, Jr.

(57) ABSTRACT

A plant propagation and display tray, capable of interlocking alignment with at least one other tray and capable of receiving and holding at least one plant pot, comprises a back wall and a bottom ledge forwardly projecting from said back wall. The ledge is inclined towards the back wall and comprises alternating projections and troughs, each trough inclining towards a trough point of abutment with the back wall and being of a conformation to securely hold one plant pot such that an open proximal end of the pot is exposed to view and a distal end of the pot is adjacent to the back wall. Each projection has an upper surface inclining towards a projection point of abutment with the back wall. The projection point of abutment is higher than the trough point of abutment with the back wall. The tray is capable of being attached to a wall surface.

37 Claims, 22 Drawing Sheets

(56) References Cited

U.S. PATENT DOCUMENTS

| | | |
|---|---|---|
| 2009/0223126 A1* | 9/2009 | Garner et al. .................. 47/66.7 |
| 2010/0037517 A1* | 2/2010 | Copping et al. .................. 47/79 |
| 2010/0146855 A1* | 6/2010 | Ma .................................. 47/82 |
| 2011/0258925 A1* | 10/2011 | Baker ............................ 47/65.8 |

* cited by examiner

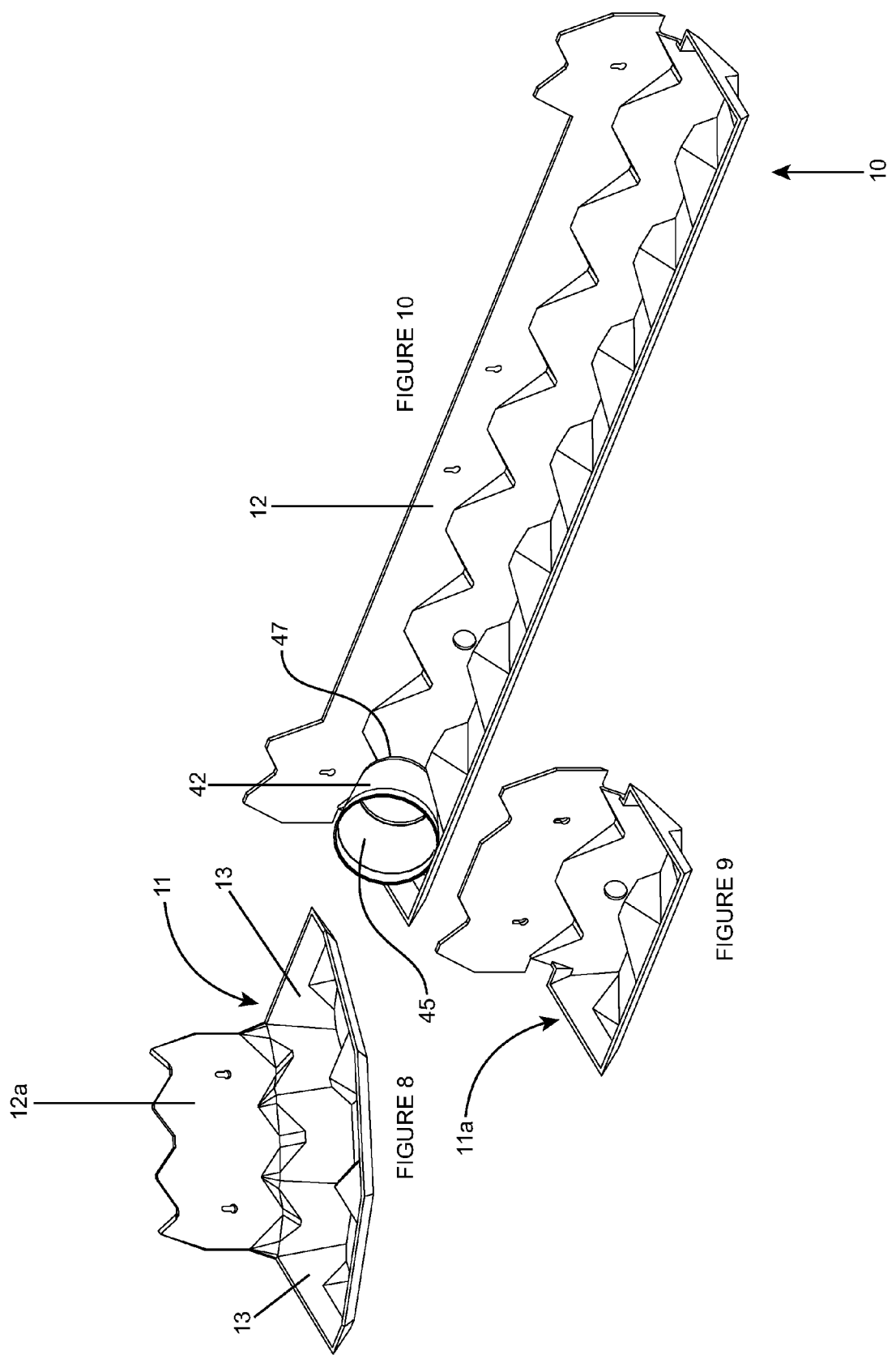

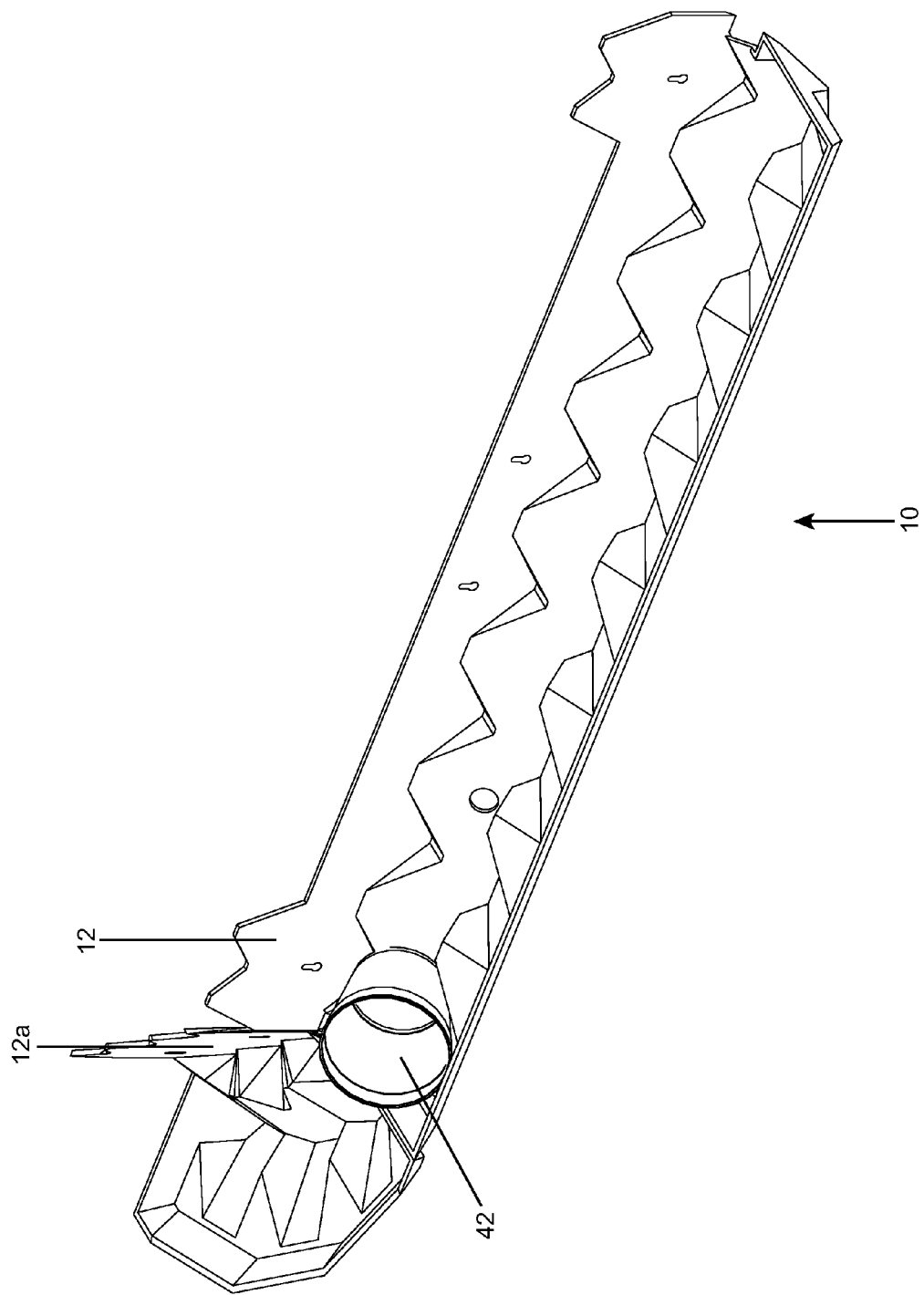

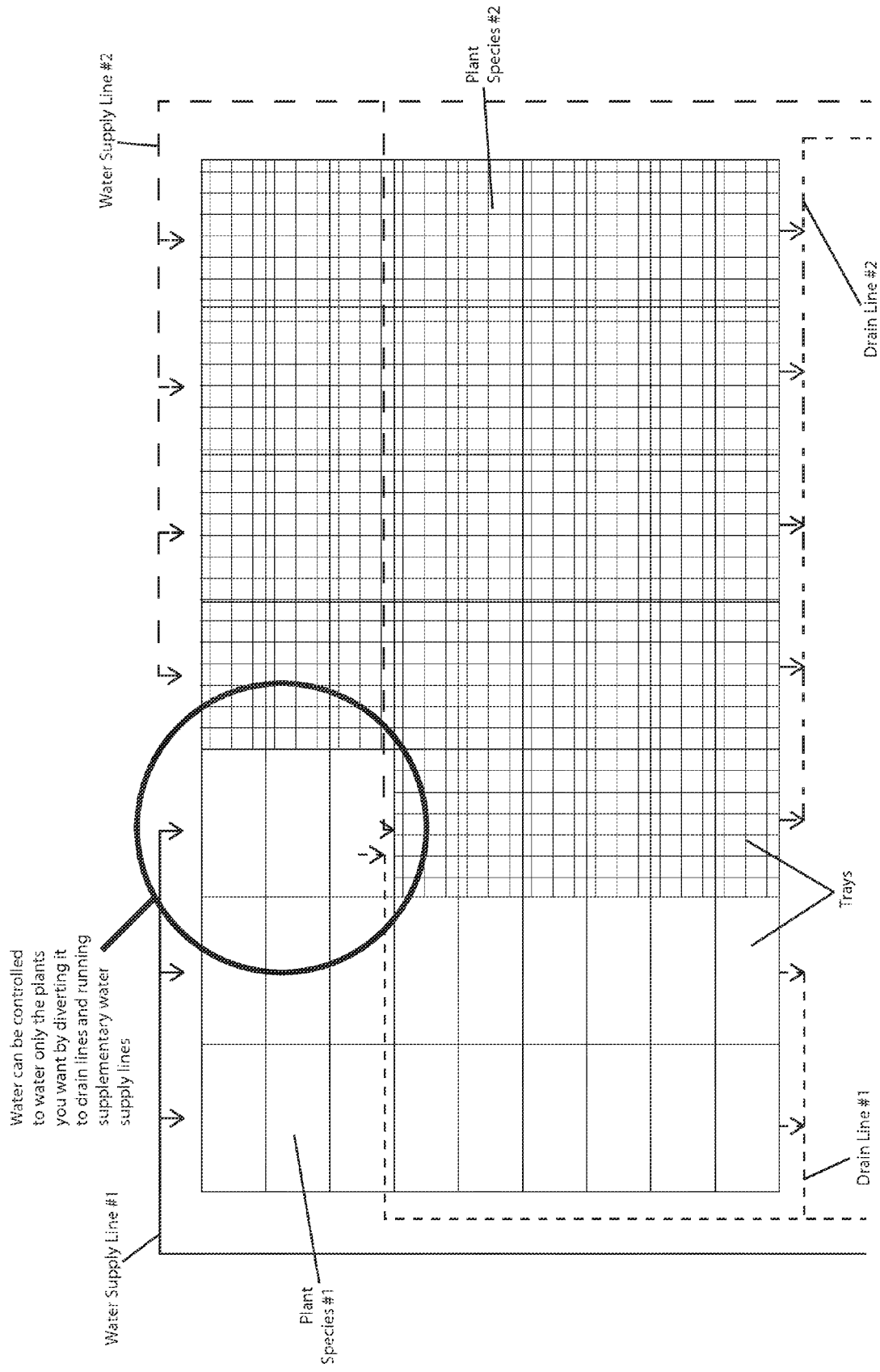

INTERLOCKING PLANT PROPAGATION AND DISPLAY TRAY AND METHOD OF USE AND ASSEMBLY

CROSS-REFERENCE TO RELATED APPLICATIONS

This application claims the priority, under 35 U.S.C. §119, of copending U.S. Provisional Patent Application No. 61/438,150, filed Jan. 31, 2011; the prior application is herewith incorporated by reference herein in its entirety.

STATEMENT REGARDING FEDERALLY SPONSORED RESEARCH OR DEVELOPMENT

Not Applicable

FIELD OF THE INVENTION

The present invention relates to green walls and, in particular, to plant propagation and display trays and assemblies.

BACKGROUND OF THE INVENTION

In recent years, the push for both industry and individuals to be more environmentally aware has led to many green initiatives including green roofs and green walls. Currently in cities such as Chicago, over 2.5 million square feet of the downtown core roof space are covered with hardy green roof plants. Green walls and roofs provide savings on insulation and place less load bearing strain on a building. In addition, plants being carbon producers, the use of green walls and roofs are thought to decrease greenhouse gas emissions. Further still, these green walls and roofs act to offset the newly identified 'urban heat island effect' where the heat-absorbing surfaces in a city raise its temperature to as much as 8 degrees higher than that of the surrounding countryside.

However, green walls currently known in the art have their own unique set of challenges associated with them, the first being gravity. In conventional methods of greening buildings, it is well known to cover wall surfaces with ivy or to plant trees into the soil deposited on wall surfaces. One of the early green walls disclosed in U.S. Pat. No. 5,257,476 requires preparation of a plurality of bags loaded with soil, piling the bags against a wall surface of a building and inserting trees' roots between the piled bags so as to plant trees, erecting a lattice fence outside the stacked bags, and promoting the plants growth and clinging to the lattice.

In more recent years, seeding and planting panels have been used for greening surfaces of permanent constructions such as buildings, retaining walls, and the like. These seeding and planting panels generally include a panel frame, and a seeding and planting mat or block contained within the frame. In general, these types of panel frames are fixedly secured to surfaces of existing constructions such as building wall surfaces, roofs or retaining walls, and are integrally incorporated into the constructions so as to be permanent structural elements thereof. It is very cumbersome to exchange these panels as they are not easily disengaged from their supports and removed. In addition, as the backside faces of the panels are concealed, general maintenance work is very difficult.

By way of example, the following are offered as known types of green wall technologies.

Japanese Pat. Appl. Pub. No. 2004-254565 refers to:

"The greening panel 100 is composed of a panel frame 10 installed on the vertical plane side with a support frame and forming a work opening enabling planting at least a pot seedling at least on a front face, a bag-like mat material 20A arranged and supported just in the inside of the panel frame 10, enabling cut open work from the outside of the work opening and having water absorption properties and restoring force, and a vegetation base material 30 for raising a vegetation plant P, filled in the inside of the bag-like mat material 20A or a three-dimensional netlike mat filled with the base material. A support frame is composed of many metallic linear support pipes, pipe-connecting members connecting the ends of the pipes with each other and hanging tools connected to part of the panel frame 10 and hanging the panel frame 10 on the support pipes." (Abstract)

Japanese Pat. Appl. Pub. No. 2003-155714 refers to:

"The greening panel device 1 is provided with upper and lower greening panels 3 and 5, right and left vertical members 11 and 11 fixed to a wall 7 by vertical member fixtures 9, and panel fixtures 13 for attaching each greening panel 3 and 5 in parallel across the right and left vertical members 11 and 11. The panel fixtures obliquely attach each greening panel 3 and 5 so that a lower part protrudes forward than an upper part, and water receptors 15 guiding received water to the lower greening panel are detachably provided on lower faces of the panel fixtures 13." (Abstract)

Japanese Pat. Appl. Pub. No. 2004-248550 refers to:

"This device 10 for greening a wall surface has a plurality of planting units 12 arranged along an external wall surface 4 of a building 2 and planted with plants 14. Each of the planting units 12 is hung sequentially from the top through hanging members 16 to be connected with each other. The planting unit 12 on the top is fixed to a parapet 7 on a rooftop 6 of the building 2 with a wire 18. The rooftop 6 of the building 2 is set with a lifting and lowering device 30 for lifting and lowering the planting units 12 through drawing and rolling the wire 18." (Abstract)

U.S. Pat. No. 5,579,603 describes:

"A plant-growing method for greening upright or slant wall surface is disclosed. A flexible bag is first prepared including a plurality of compartments sequentially juxtaposed in the direction of the overall length of the bag. The compartments are each provided with a plurality of openings communicating with the exterior. Soil is then loaded through the openings into the compartments with the bag being horizontally laid. Afterwards, trees are planted through the openings into the compartments. Thereupon, the bag which has been planted with the trees is suspended along the wall surface in the direction of the overall length of the bag while allowing trunks of the trees to be exposed through the openings. Water is thereafter supplied into the compartments of the bag to promote the growth of the trees." (Abstract)

United States Pat. Appl. Pub. No. 2007/0199241A1 refers to:

"A light self-supporting vegetated wall includes globally prismatic boxes, designed to be juxtaposed and/or stacked, the adjacent boxes being assembled together. Each box includes latticed or meshed surfaces, lined internally with a web, and filled with a cultivating substrate, such as humus. A network of water pipes and a network of air vents may be incorporated in the thickness of the structure, these networks passing through the parting lines between the boxes. The structure is designed for urban enhancement, as well as for producing noise screens, partition walls, hoardings and the like." (Abstract)

U.S. Pat. No. 4,658,541 describes interlocking semi-circular planters wherein plants are individually contained in each discrete planter and wherein the back walls are formed with teeth and notches for interconnection with other semi-circular planters on a wall.

U.S. Pat. No. 7,536,829 describes a planting base for use on walls and roofs comprising a holding cover having an open window divided by a holding cross-piece and a tray for supporting the holding cover and for receiving culture soil with which the holding cover is filled.

There remains the need for a simple green wall system which would allow easy installation and removal and easy replacement of plants, while at the same time providing optimal conditions for plant growth. It is an object of the present invention to obviate or mitigate the above-noted disadvantages.

Thus, a need exists to overcome the problems with the prior art systems, designs, and processes as discussed above.

SUMMARY OF THE INVENTION

The present invention provides a plant propagation and display tray, which is capable of interlocking alignment with at least one other tray and which is capable of receiving and holding at least one plant pot, comprises a back wall and a bottom ledge forwardly projecting from the back wall; the ledge being inclined towards the back wall and comprising a plurality of alternating projections and troughs, each of the troughs inclining towards a trough point of abutment with the back wall and being of a conformation to securably hold one plant pot such that an open proximal end of the plant pot is exposed to view and a distal end of the plant pot is adjacent to the back wall; each of the projections having an upper surface which inclines towards a projection point of abutment with the back wall, wherein the projection point of abutment is higher than the trough point of abutment with the back wall; wherein the tray is capable of being attached to a wall surface.

The present invention further provides a planter wall formed of a plurality of interlocking trays as described above, one above another, and/or one beside another and attached to a wall surface.

The tray of the present invention offers a multitude of advantages not found in any prior green wall system. In particular, the provision of the alternating troughs and projections on the ledge, and the inclinations of each "backwards" i.e. to the direction of the back wall controls water delivery to the plants (in the pots), once such plants are in place within the troughs. In this unique arrangement, the body of the projections essentially takes up space where water would otherwise pool. The base of a plant pot, once in place, is thereby only exposed to enough water to allow wicking, while avoiding soaking. This reduces or eliminates problems such as rot. Furthermore, many plant varieties do not thrive being watered from the top.

The design and conformation of the tray in accordance with the present invention allows interlocking placement of a plurality of trays, one above the other, or one beside another and all attached to a wall surface thereby forming, once plant pots are inserted, a "green wall". By way of water drainage from an upper level tray to one below, watering may be accomplished by the use of gravity.

The system of the present invention is highly adaptable to a wide variety of green wall installations.

These and other objects and advantages of the present invention will become more apparent to those skilled in the art upon reviewing the description of the preferred embodiments of the invention, in conjunction with the figures and examples.

BRIEF DESCRIPTION OF THE DRAWINGS

The following figures set forth embodiments of the invention in which like reference numerals denote like parts. Embodiments of the invention are illustrated by way of example and not by way of limitation in the accompanying figures and description of the preferred embodiments which follow.

FIG. 8 is an isometric view of a corner tray piece;

FIG. 9 is a view of isometric view of a single pot plant propagation and display tray;

FIG. 10 is a perspective view of a plant propagation and display tray including one plant pot;

FIG. 11 is a perspective view of a plant propagation and display tray including one plant pot and a corner tray piece;

FIG. 24 is a schematic for a multi-tray assembly showing multiple water supply lines.

DETAILED DESCRIPTION OF THE INVENTION

Figure 1:
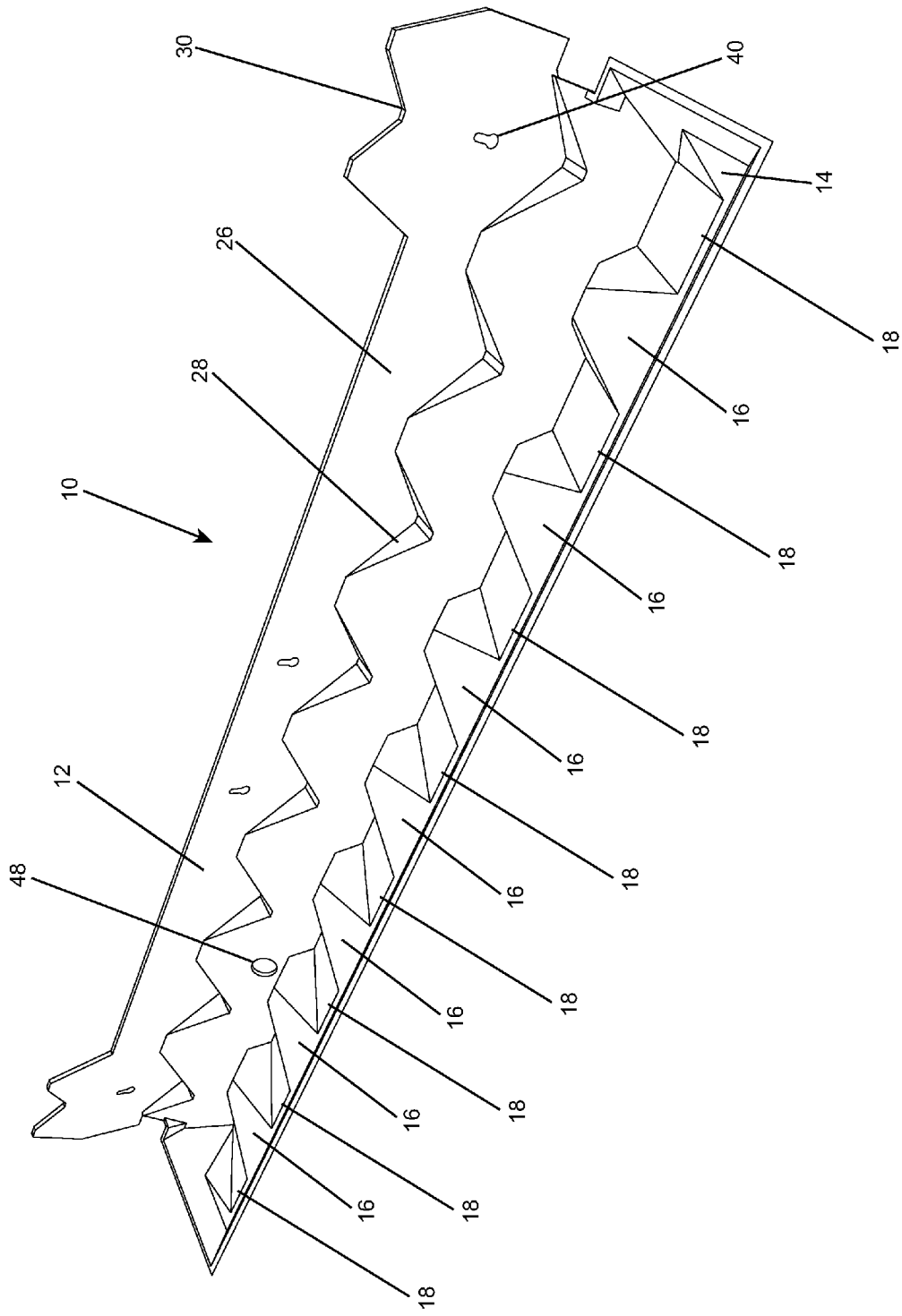
FIG. 1 is an perspective view of a plant propagation and display tray according to one embodiment.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

A detailed description of one or more embodiments of the invention is provided below along with accompanying figures that illustrate the principles of the invention. As such, this detailed description illustrates the invention by way of example and not by way of limitation. The description will clearly enable one skilled in the art to make and use the invention, and describes several embodiments, adaptations, variations and alternatives and uses of the invention, including what we presently believe is the best mode for carrying out the invention. It is to be clearly understood that routine variations and adaptations can be made to the invention as described, and such variations and adaptations squarely fall within the spirit and scope of the invention.

In other words, the invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Similar reference characters denote similar elements throughout various views depicted in the figures.

This description of preferred embodiments is to be read in connection with the accompanying drawings, which are part of the entire written description of this invention. In the description, corresponding reference numbers are used throughout to identify the same or functionally similar elements. If and when used herein relative terms such as "horizontal," "vertical," "up," "down," "top" and "bottom" "front", "back" as well as derivatives thereof (e.g., "horizontally," "downwardly," "upwardly," etc . . . ) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral", "adjacent" and the like (if used) are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In the present disclosure and claims, the word "comprising" and its derivatives including "comprises" and "comprise" include each of the stated integers but does not exclude the inclusion of one or more further integers or elements. The terms cords and cording may be used interchangeably.

The present invention provides, in one aspect, a plant propagation and display tray that provides several key advantages including the provision, by way of a unique configuration of troughs and projections, of a zone for placement of plant pots around which water does not unnecessarily pool.

Figure 2:
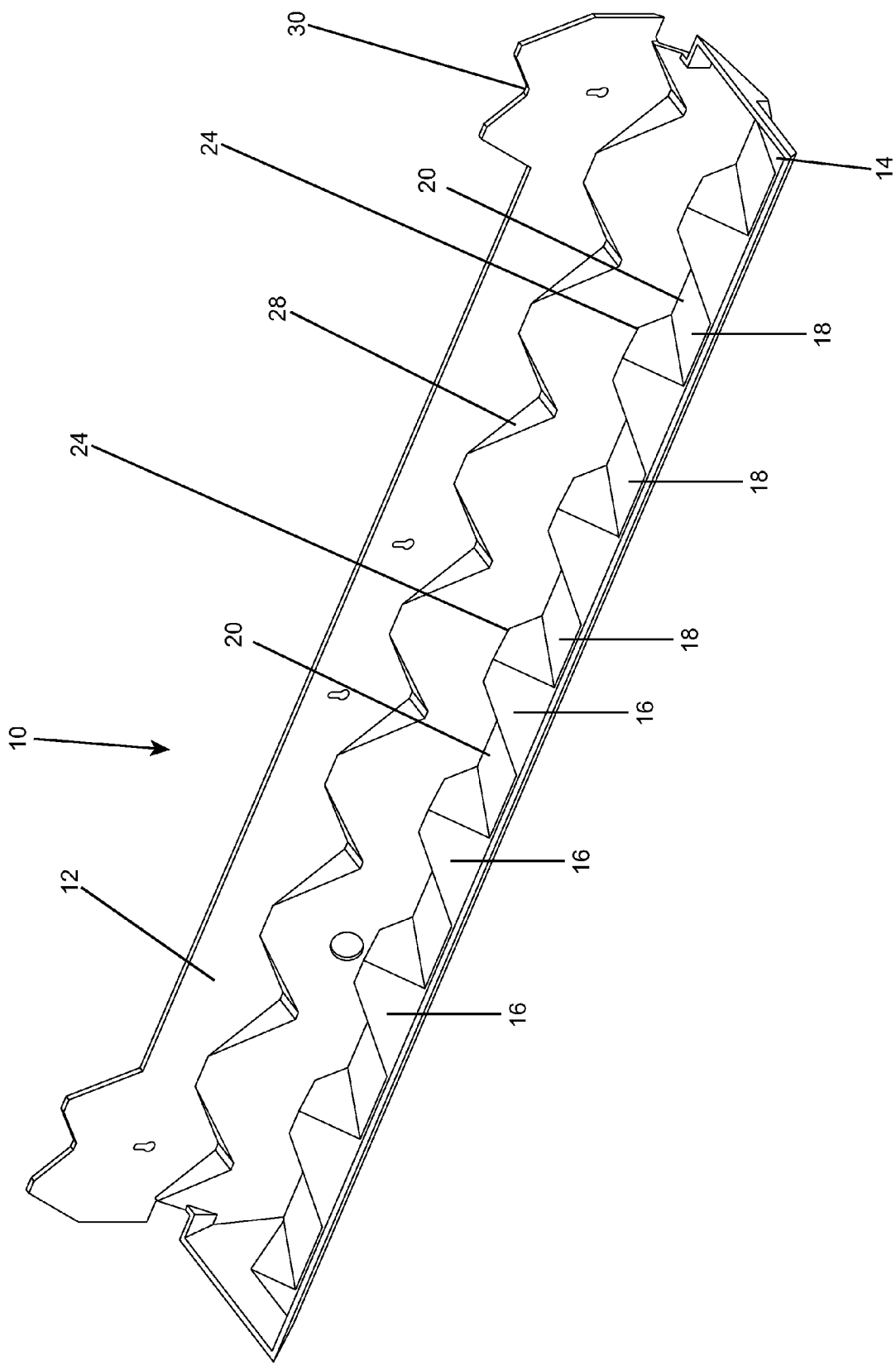
FIG. 2 is a further perspective view of the plant propagation and display tray of FIG. 1.
Figure 3:
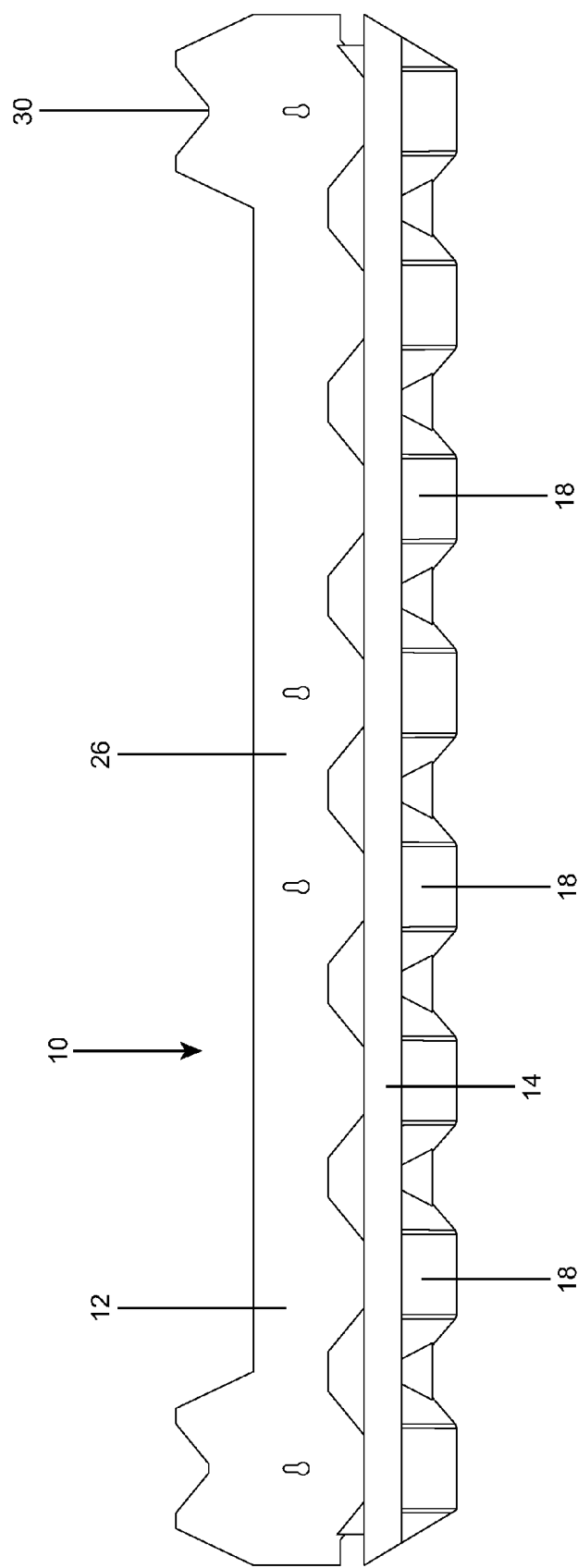
FIG. 3 is a front view of a plant propagation and display tray.

Referring to FIGS. 1-3, an embodiment of a plant propagation and display tray 10 is generally shown. The plant propagation and display tray 10 comprises a back wall 12 and a bottom ledge 14 forwardly projecting from said back wall. As provided herein, the "back wall" refers to the moiety of the tray that, in use, will abut the structure against which the planter wall is to be placed. Ledge 14 is inclined towards the back wall and comprises a plurality of alternating projections, 16 and troughs 18, with each of troughs 18 inclining towards a trough point of abutment, 20 with the back wall. Troughs 18 are of a conformation to securably hold one plant pot, (shown in 10, 11, 12 and 13, among other figures) such that an open proximal end of the plant pot is exposed to view and a distal end of the plant pot is adjacent to the back wall. Each of projections 16 have an upper surface 22 which inclines towards a projection point of abutment 24 with the back wall, wherein the projection point of abutment 24 is generally higher than the trough point of abutment 20 with the back wall. The purpose for this design will be described further below.

Back wall 12 comprises a substantially flat upper portion 26 and a lower portion, adjacent the ledge, which is thicker than the upper portion and which is defined by a plurality of substantially V-shaped depressions, 28, each of which points towards a trough on the ledge. The reverse side of back wall 12 is depicted in FIG. 4 which shows a substantially flat surface for alignment with a wall surface, when the tray is in use.

Figure 12:
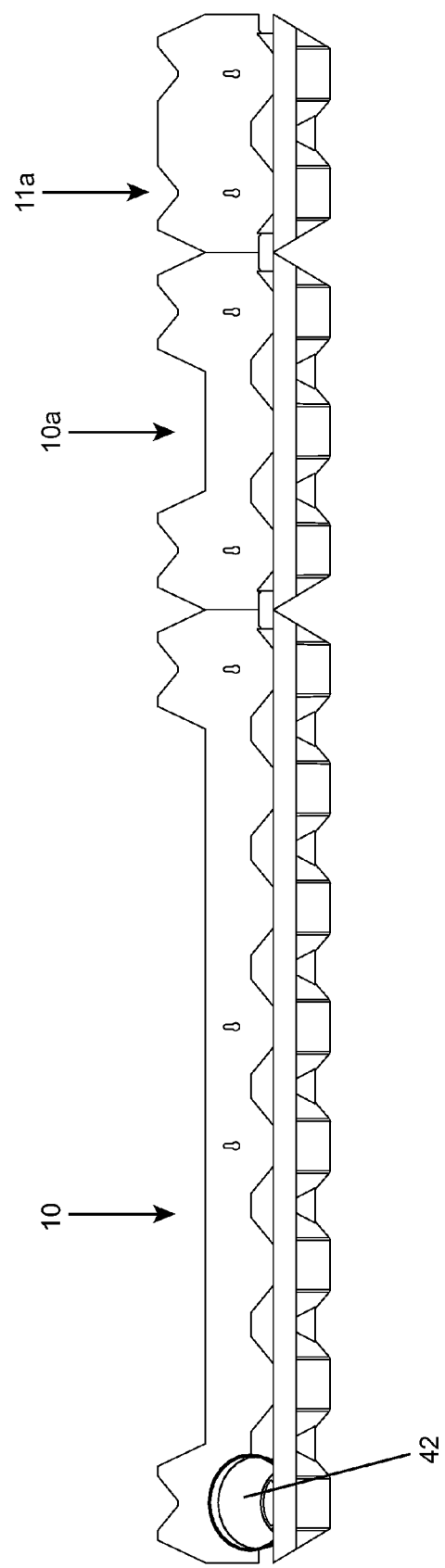
FIG. 12 is a front plan view of three adjacent plant propagation and display trays, of differing length.
Figure 13:
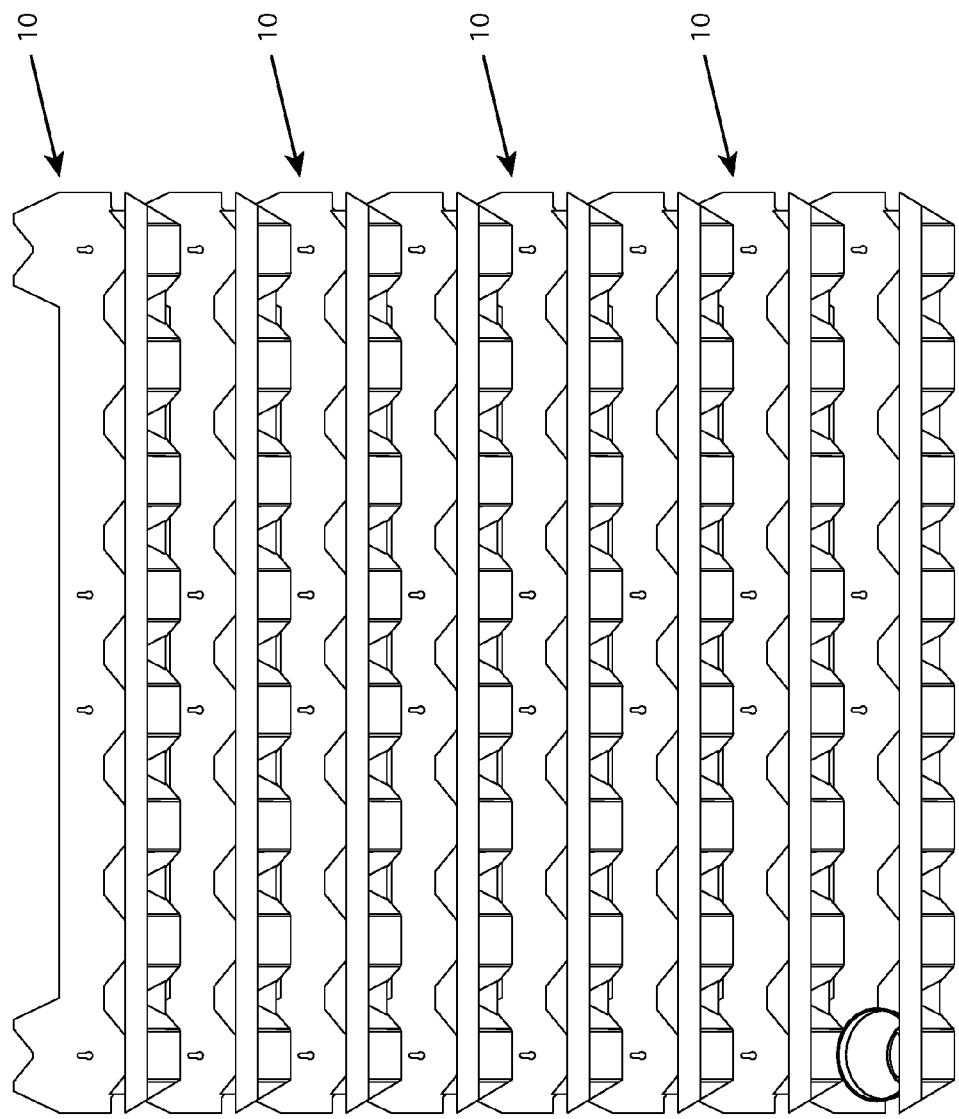
FIG. 13 is a front plan view of eight plant propagation and display trays in stacking arrangement.

It has been found that the inclusion of such V-shaped depressions, within this relatively thicker part of the back wall and "aligned with" or pointing towards its corresponding ledge trough affords enormous advantages in increasing the overall strength and weight-bearing ability of the tray. Without this feature, and for trays with more than a few plant-pots inserted therein, there is a risk of sag and the potential of the tray not being able to support the weight of multiple pots, growing media and plants. It is fully contemplated within the scope of the present invention that trays may be of varying lengths and comprise differing numbers of plant-pot receiving troughs. For example, the tray in FIG. 1 depicts 8 plant-pot receiving troughs. In FIG. 12, trays are depicted with 8, 3 and 1 plant-pot receiving troughs.

Figure 4:
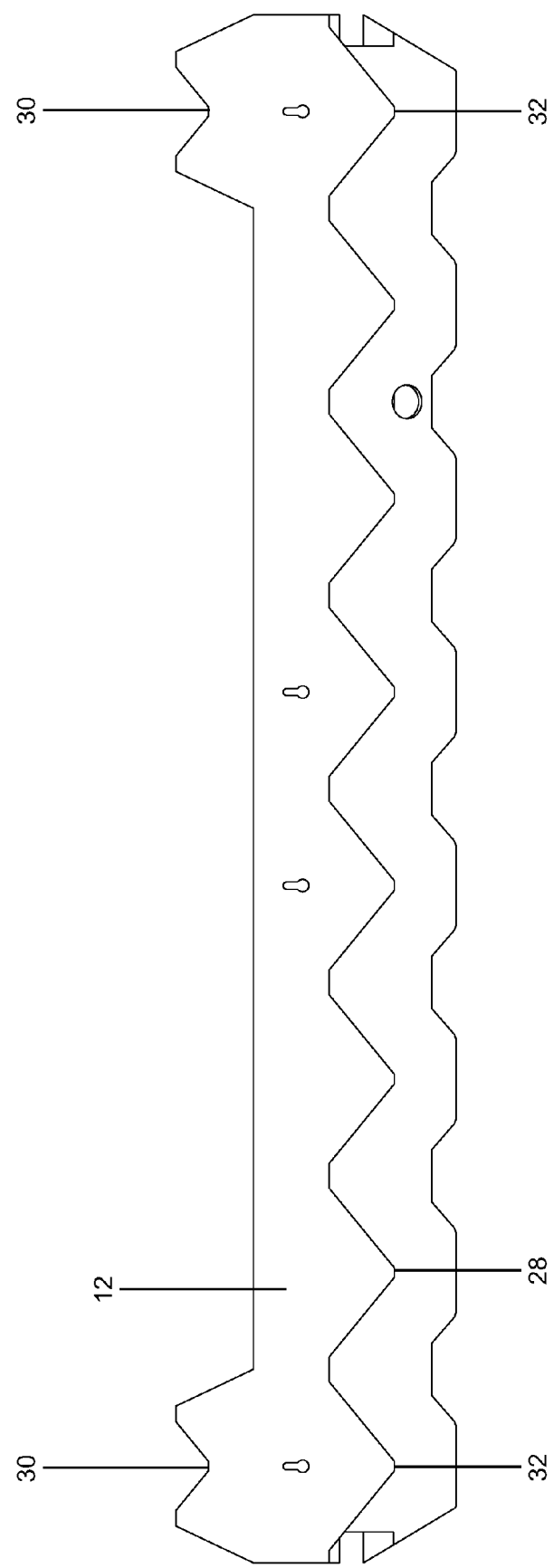
FIG. 4 is a back plan view of a plant propagation and display panel.
Figure 14:
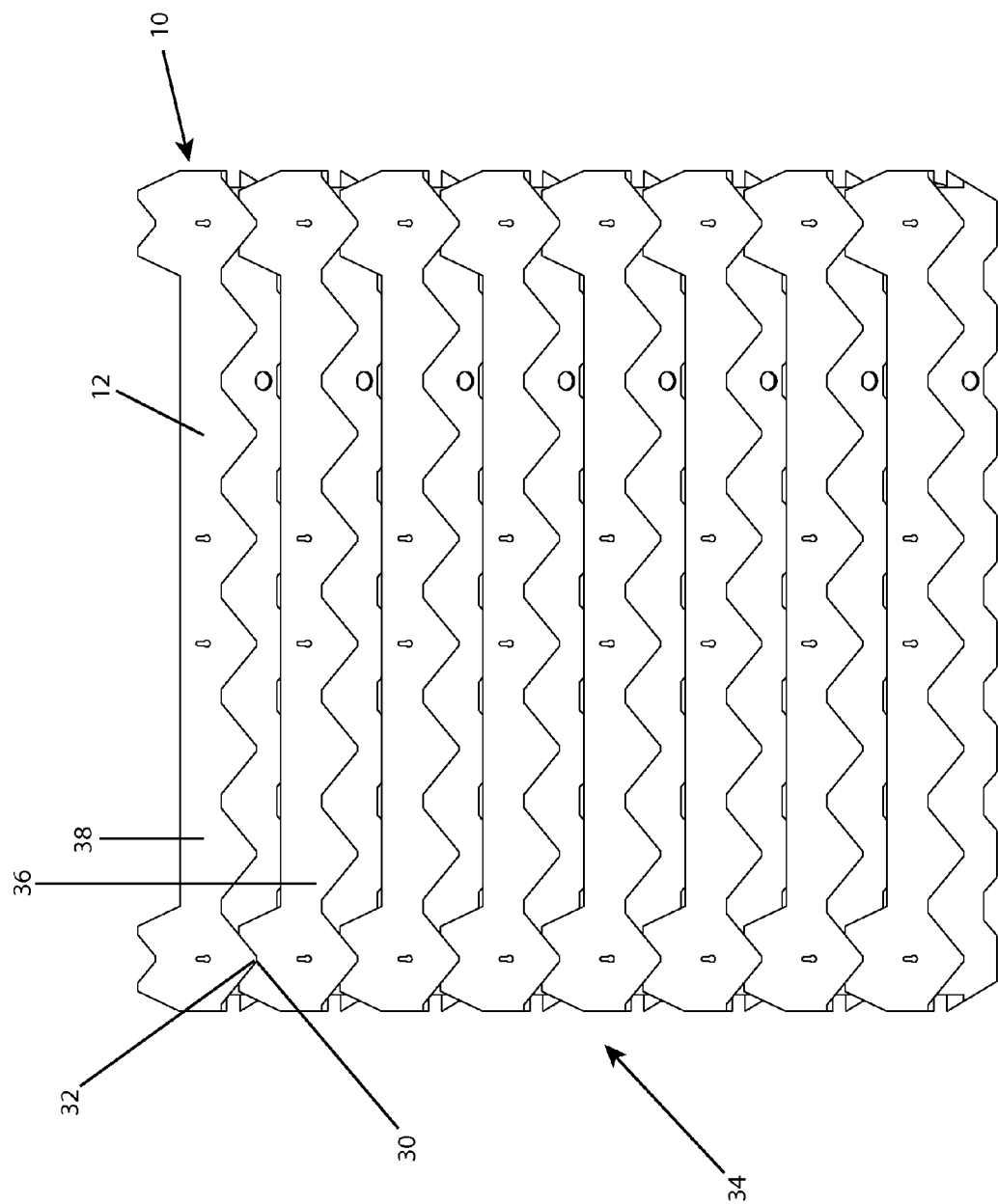
FIG. 14 is a back plan view of eight plant propagation and display trays in stacking arrangement.
Figure 15:
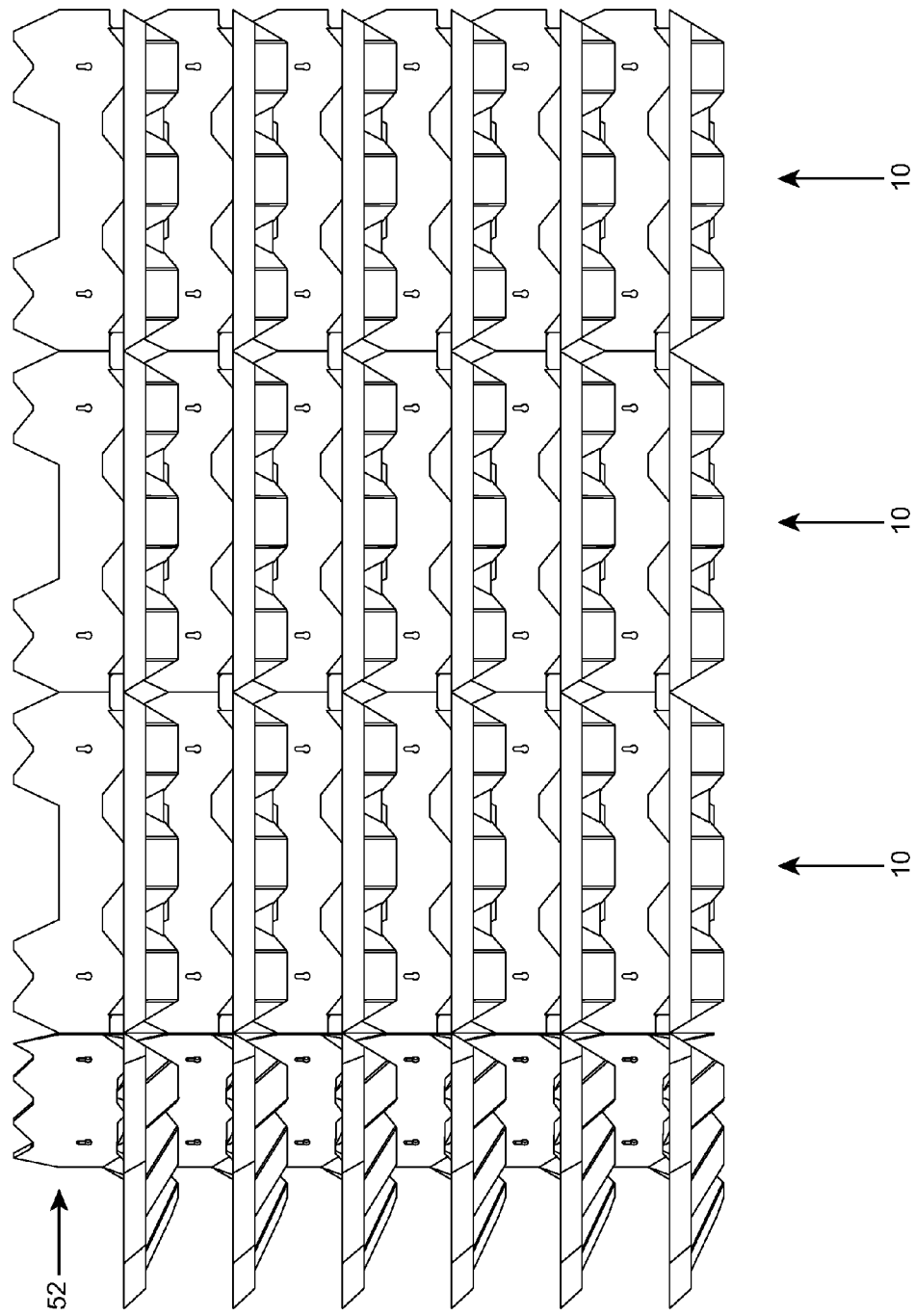
FIG. 15 is a perspective view of a plurality of plant propagation and display trays, each adjacent to a respective corner tray piece.

Female alignment member 30 is shown in FIGS. 1-4, integrally formed as part of back wall 12. Similarly male alignment member 32 is best shown in FIG. 4. In operation and as best shown in FIG. 14, when a plurality of trays provided generally as 34, are stacked for use on a wall surface, each such tray is aligned in the correct position, relative to the trays above and below, by use of the male and female alignment members. More specifically, for tray 36, female alignment member 30 is engaged by male alignment member 32 of tray 38. This alignment obviates the need for any other measuring means to ensure accurate vertical stacking of more than one tray. Holes 40 are provided on each tray for pass through by screws, nails or other means of securing the tray to a wall surface.

Figure 5:
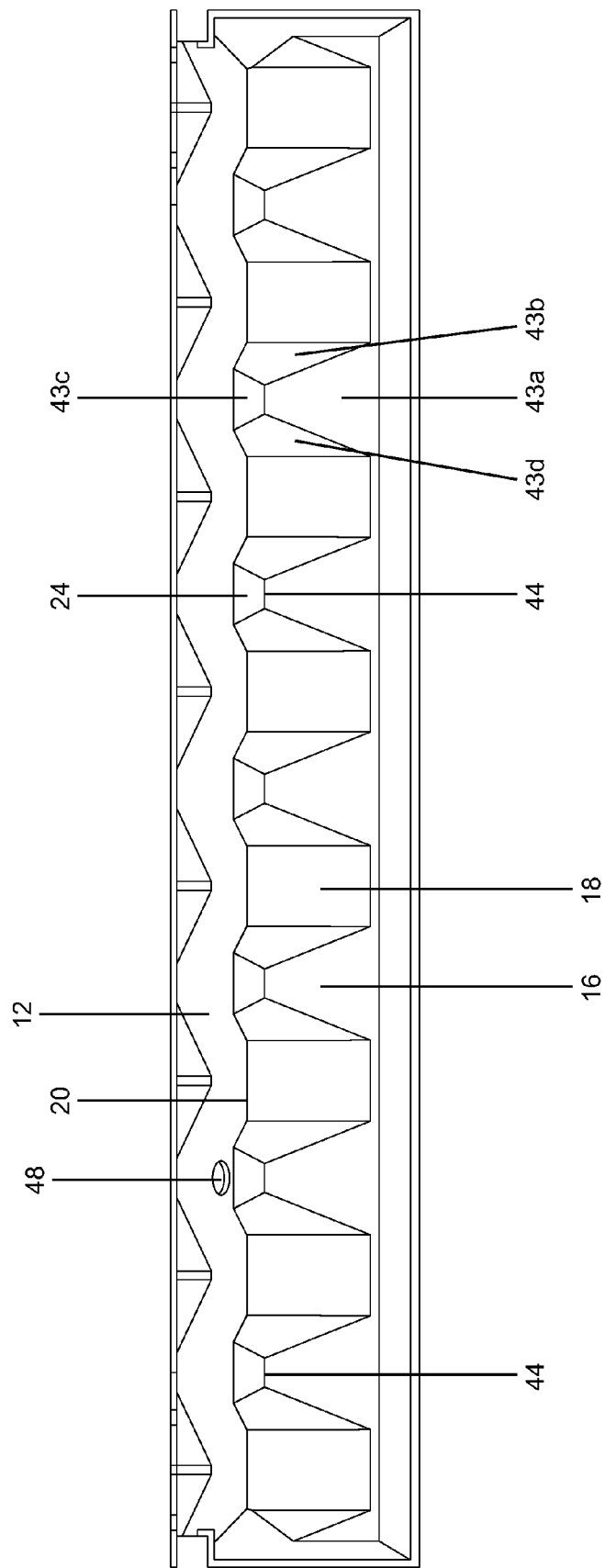
FIG. 5 is a top plan view of a plant propagation and display tray.

FIG. 5 is useful to show the alternating arrangement of projections 16 and troughs 18 and the preferred shape and inclination of those features towards back wall 12. Troughs 18 incline to trough points of abutment 20 and are of a conformation which is acceptable to receive and securably hold a desired size of plant pot 42 (FIGS. 11 and 12, among other figures, show one plant pot in place). The distal end of plant pot 42, when in place within trough 18, sits adjacent to trough point of abutment 20. The entirety of plant pot 42 is additionally held in place by the conformation of projections 16. In FIG. 5, the entire structure of each projection is clearly shown. In a preferred form, each projection comprising four sides (43a, 43b, 43c and 43d) meeting at apex 44. Side 43c inclines towards and meets back wall 12 at projection point of abutment 24. The importance of the configuration of projection 16 and trough 18 becomes apparent in respect to water distribution and pooling within tray 10 and draining from tray 10. An understanding of this is best achieved with reference to FIGS. 5, 22 and 23.

Figure 6:
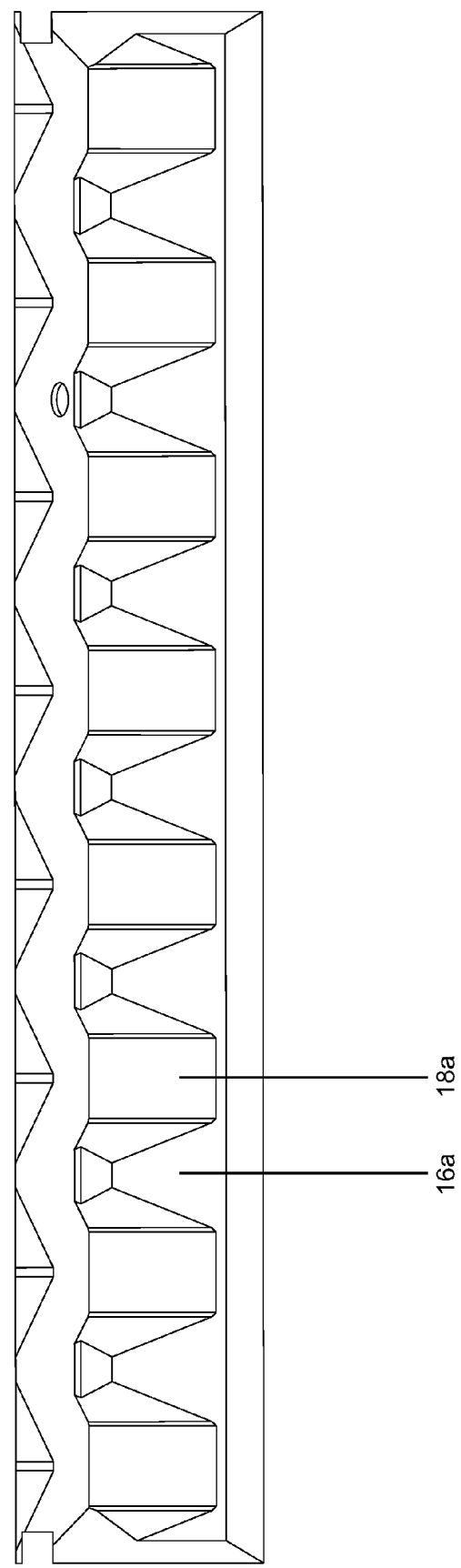
FIG. 6 is a bottom plan view of a plant propagation and display tray.

FIG. 6 depicts an underside view of the tray of FIG. 5 and wherein each projection 16 (in FIG. 5) is shown as under-trough 16a and likewise each trough 18 (in FIG. 5) is shown as under-projection 18a.

Figure 7:
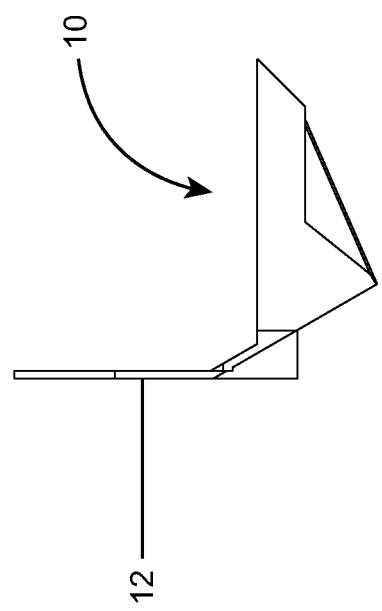
FIG. 7 is an end view of a plant propagation and display tray.

FIG. 7 depicts an end view of display tray 10 showing back wall 12.

FIG. 10 depicts a perspective view of tray 10 having pot 42 in situ within one trough. Proximal end of plant pot 45 is the end into which plants will be placed. Distal end 47 abuts back wall 12.

FIG. 8 an isometric view of a corner tray piece 11 showing back wall 12a and end walls 13. Corner tray piece may be used to "wrap" an interlocking tray arrangement around a corner. It is preferred that plant trays 12 abut end walls 13. This is shown more specifically in FIG. 11. Preferably, end wall 13 abuts an exposed end of tray 10, collectively forming a projection.

FIG. 9 is a view of isometric view of a single pot plant propagation and display tray 11a. Such single pieces, in operation and use may abut one or more long tray pieces (such as tray 10) or one or more corner pieces, such as 11 and aid in flexible design configurations. FIG. 12 illustrates the alignment or abutment of tray pieces of varying length to accommodate a multitude of design options. In this case, tray 10 (a long tray piece) abuts tray 10a (a mid-sized piece) which in turn abuts tray 11a (a single cup tray piece). Regardless of size (long, medium, single, or in fact other length), the principle of the invention and alignment of troughs and projections is applied.

Figure 22:
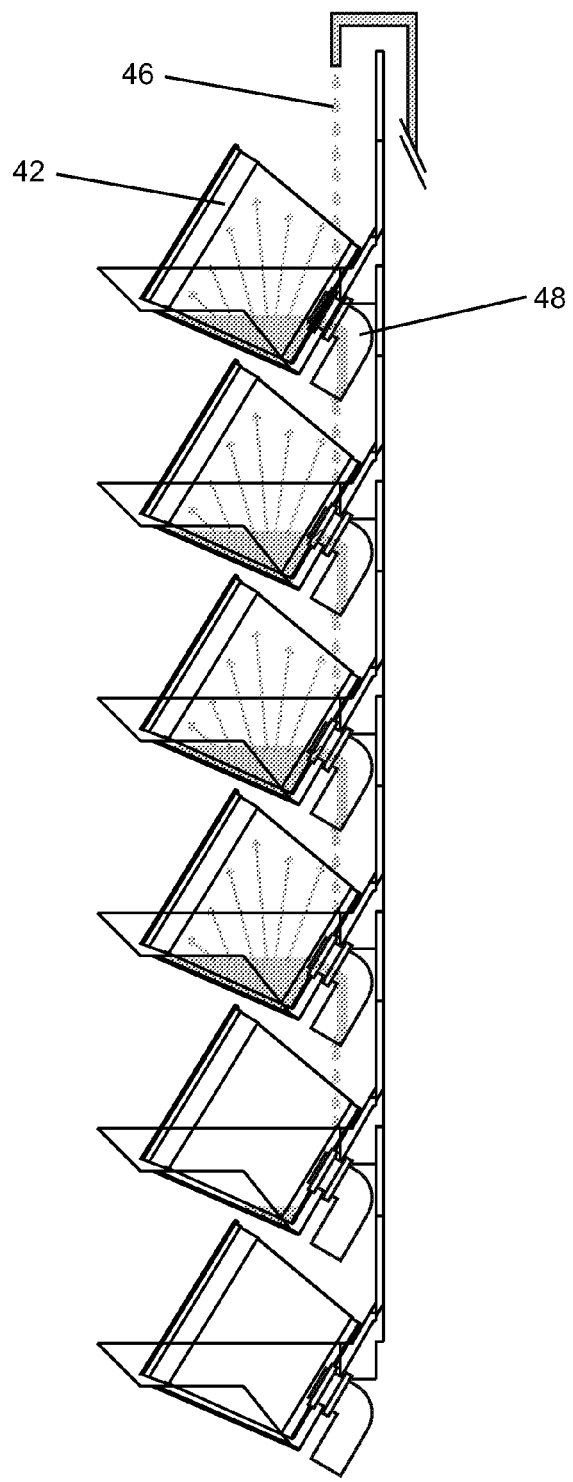
FIG. 22 is a cross-sectional depiction of the irrigation/watering system in accordance with the present invention.
Figure 23:
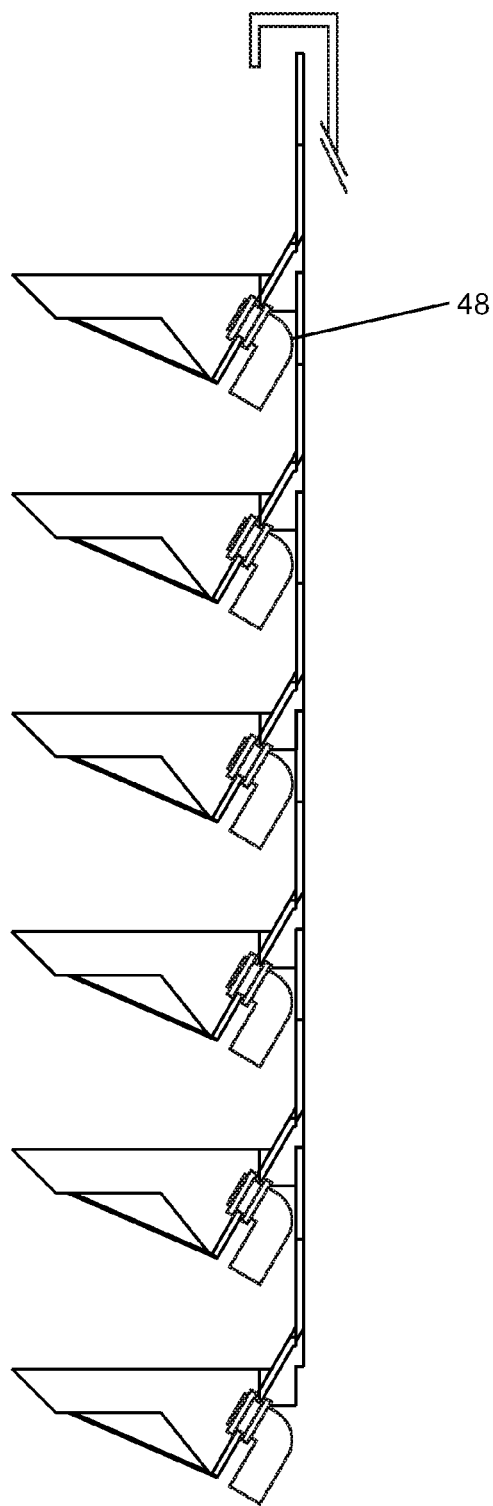
FIG. 23 is cross-sectional depiction of the irrigation/watering system of FIG. 22, without the plant pots in situ.

When trays are installed, one above another on a wall surface, watering can be initiated in a preferred form, from the top of the assembly. As shown in FIGS. 22 (pots) and 23 (no pots), water 46 is introduced into a first tray level and will travel along the tray to each trough 18 (troughs shown best in FIGS. 1, 2 and 5). Due to the limited space afforded by projections 16, and the space within the trough filled by plant pot 42, water will rise to the level of the projection point of abutment 24 and will "spill over" to the next trough in sequence. By virtue of this unique configuration and design, space is afforded for only a minimal amount of water near the distal end of each plant pot, enough for wicking and not for soaking. As such, unneeded water quickly moves along the tray, over projection sides 43c and will egress from a tray at drain 48. When trays are installed, one above another, drain 48 will be the conduit for water supply to the tray level below, as shown clearly in FIG. 22.

In a further alternative embodiment, trays 10 are displayed on a wall surface in an assembly 50, as depicted in FIGS. 13-18, 20 and 21. This assembly includes multiple trays 10 displayed side-by-side in adjacent rows and/or displayed above and below one another in vertical "stacks". Also provided are corner tray pieces 52 (as shown best in FIGS. 16 and 18) for wrapping trays around a non-flat wall surface. These corner tray pieces allow for uninterrupted green wall around curves and corners and enhance the adaptability of the entire display system.

Each of trays 10 are configured for simple, removable engagement with an adjacent tray 10 using the mating mechanism described above, for vertical stacking.

Figure 16:
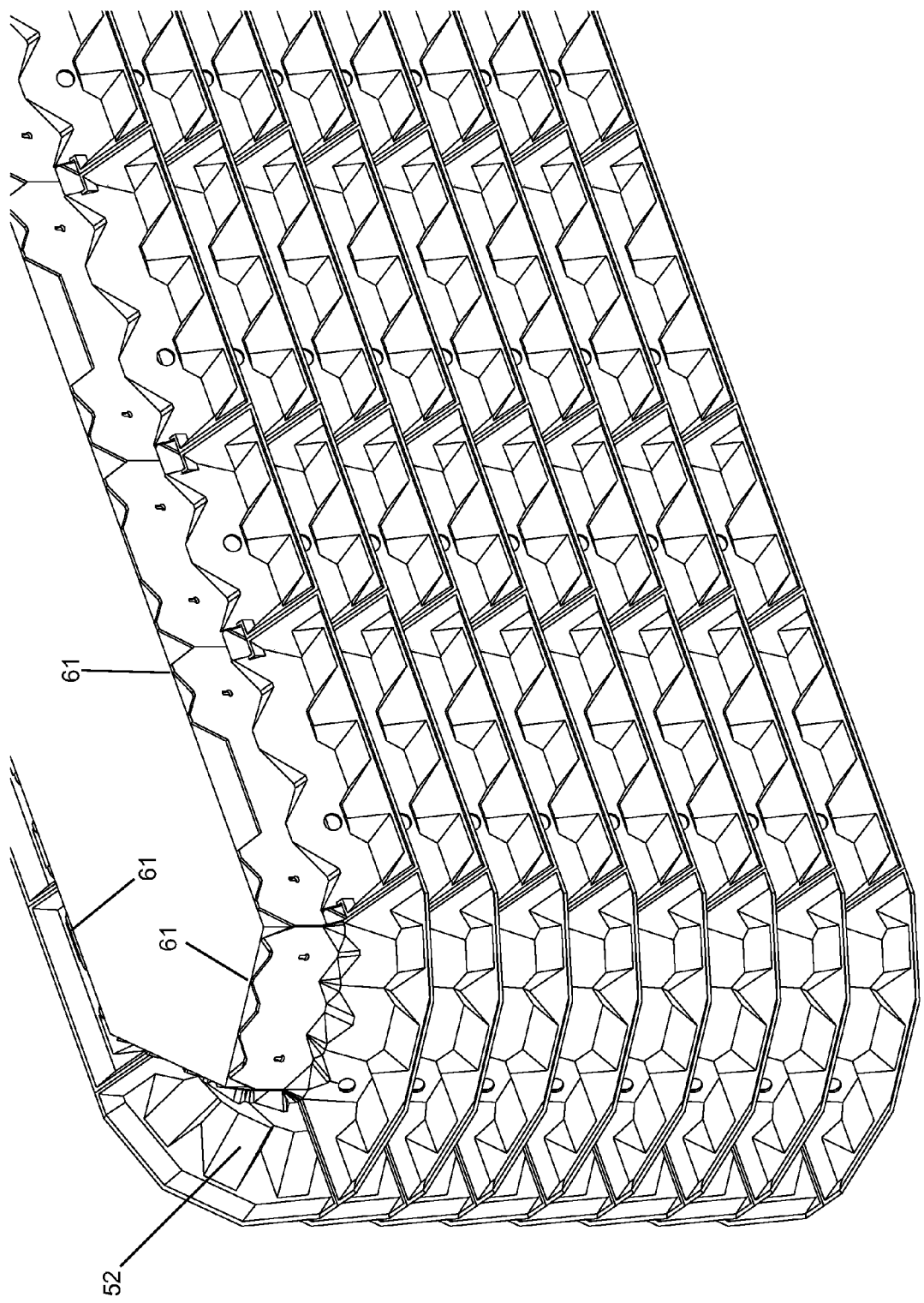
FIG. 16 is a perspective view, from the top, of a plurality of plant propagation and display trays each adjacent to a respective corner tray piece, with each corner tray piece then being adjacent to a respective plant propagation and display tray on an opposite side of a support structure.
Figure 17:
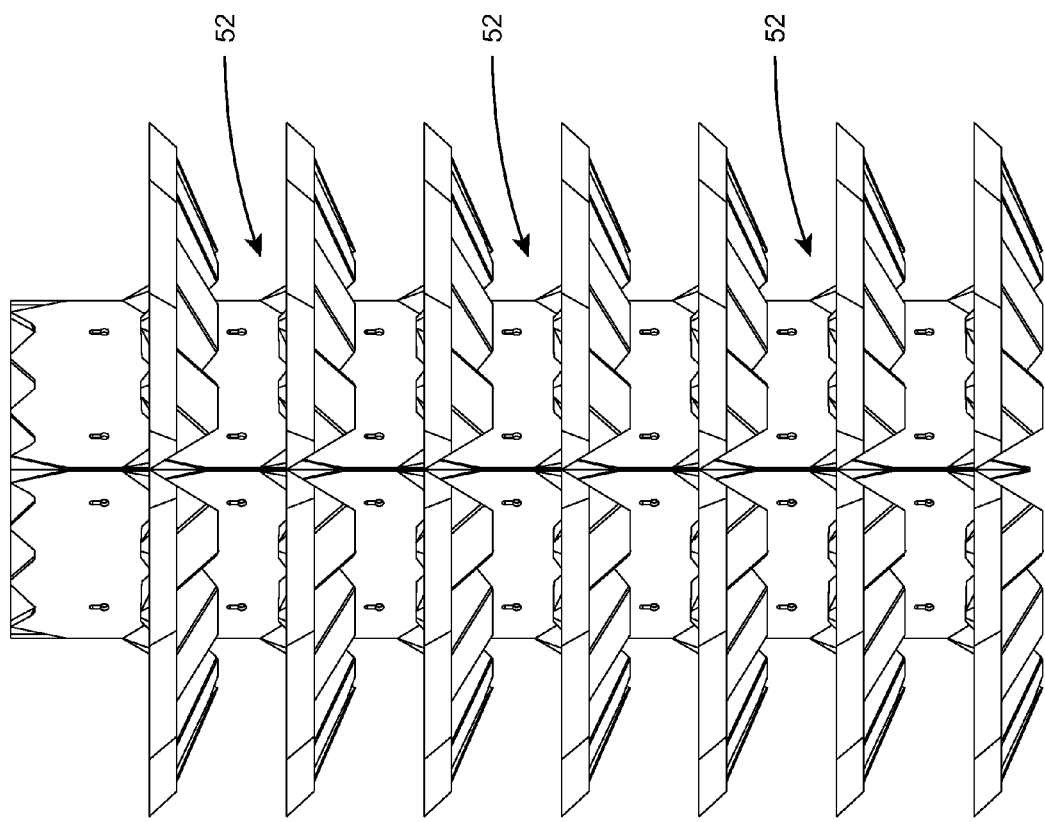
FIG. 17 is a perspective view, from the side of five corner tray pieces, each abutting a respective plant propagation and display tray on both sides of a support structure.
Figure 18:
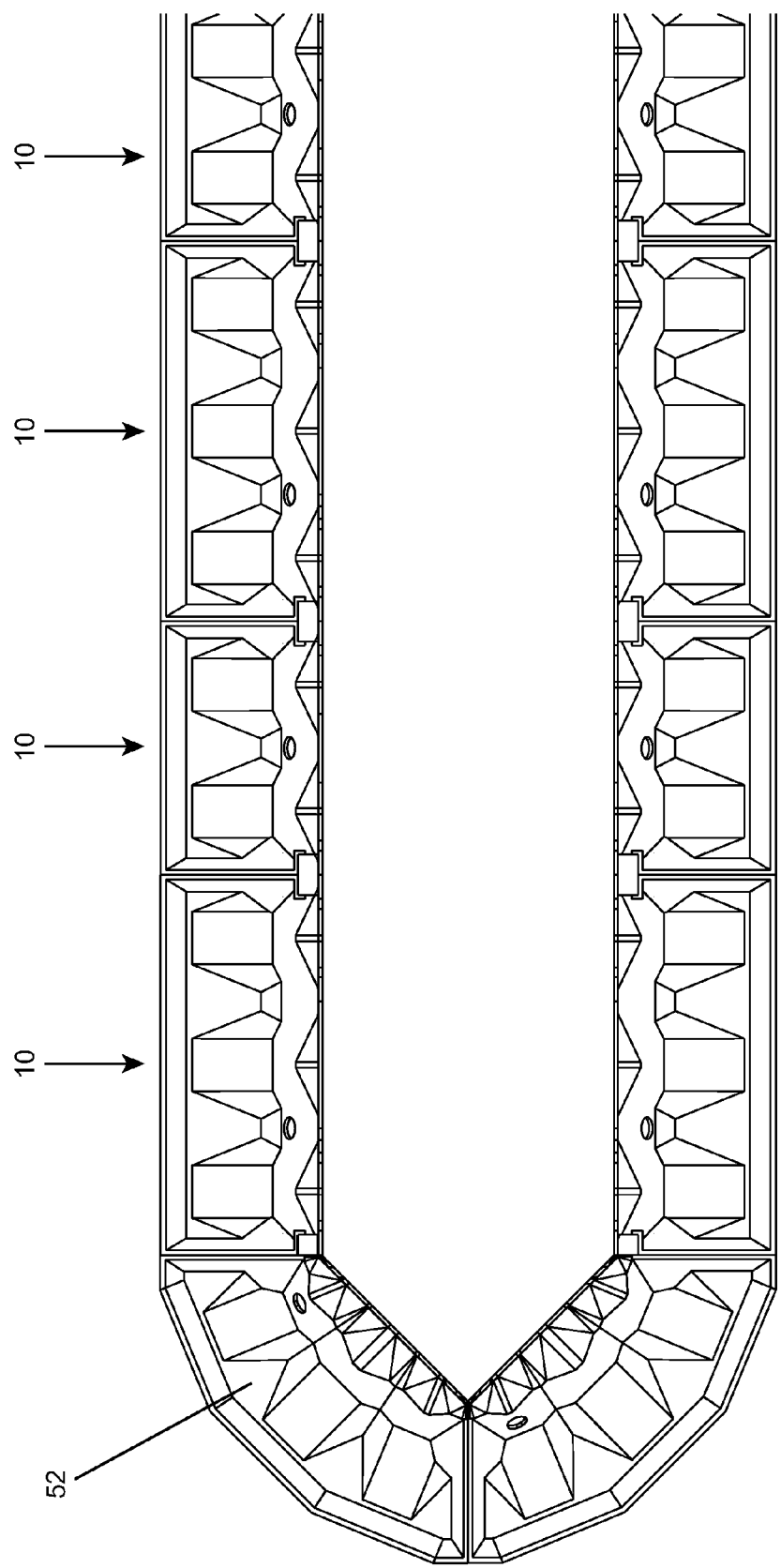
FIG. 18 is a top plan view of a plurality of two-pot plant propagation and display trays, with one being adjacent to a corner tray piece, which is adjacent to a further two-pot plant propagation and display tray on an opposite side of a support structure.
Figure 20:
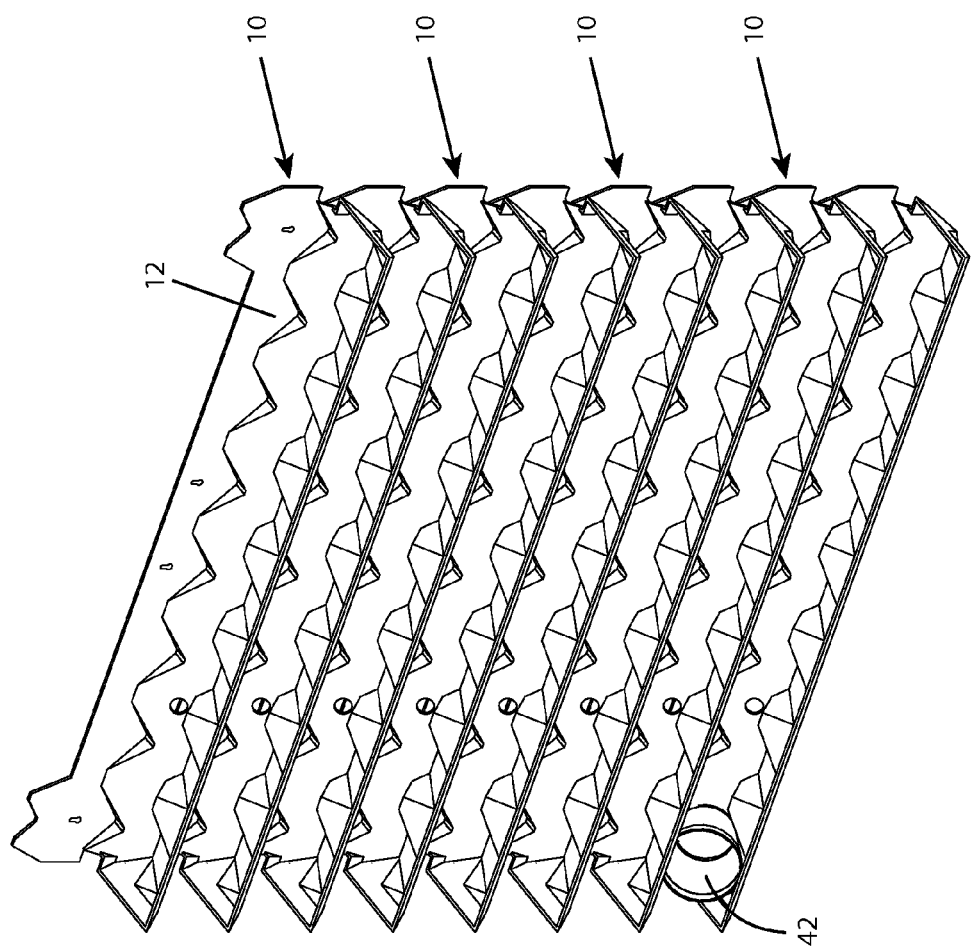
FIG. 20 is a perspective view of the eight plant propagation and display trays in stacking arrangement, of FIG. 13.
Figure 21:
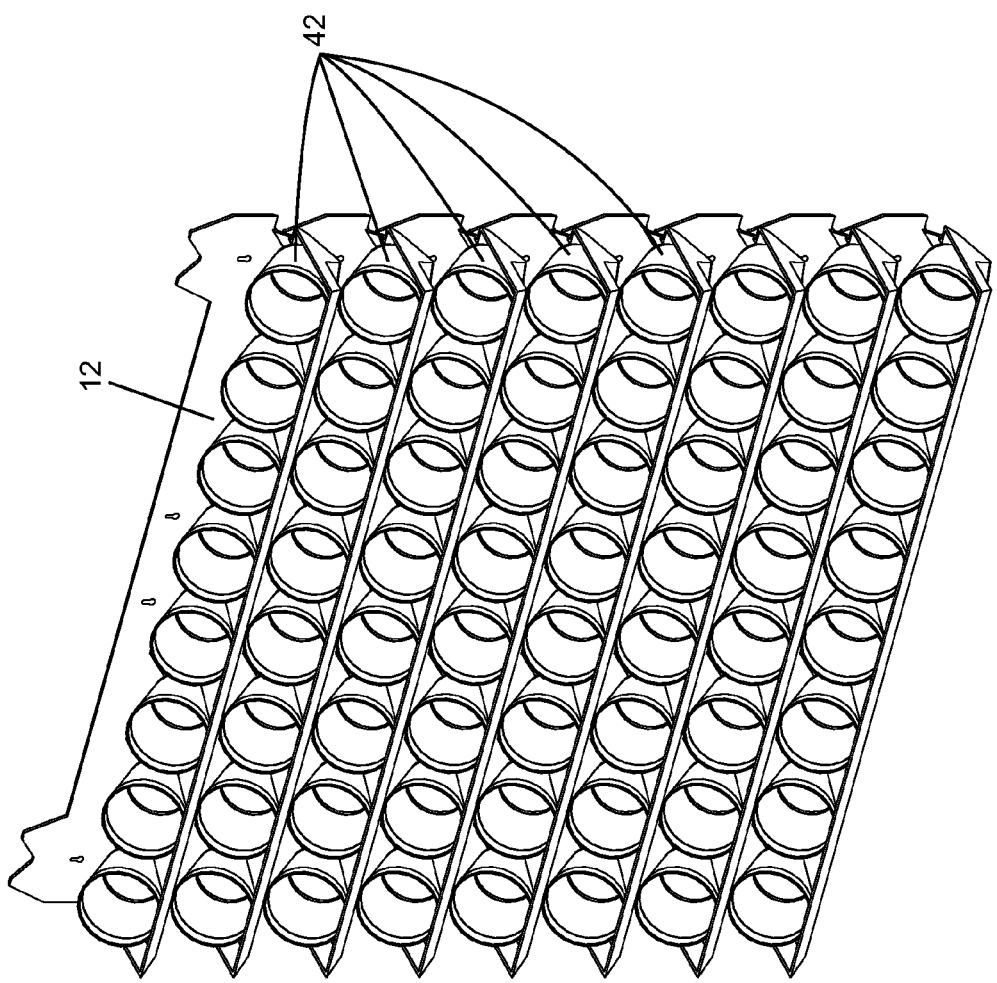
FIG. 21 is a perspective view of the eight plant propagation and display trays in stacking arrangement, of FIG. 20, but each trough containing a plant pot.

FIG. 16 illustrates a preferred embodiment of multi-tray stacked assembly encircling around end 60 of two joining wall surfaces 61. None of the advantages or functionality of the tray is lost whether the tray is a corner piece, a long tray or a short tray. FIG. 17 depicts an end view of this same configuration showing primarily end tray pieces 52. FIG. 18 depicts a "slice" of this same multi-tray configuration showing end tray pieces 52 adjacent to plant trays 10. FIGS. 20 and 21 depict eight vertically stacked and nested trays (10). FIG. 20 is ready to be loaded with pots (one is in place at the lowest tray) whereas in FIG. 21 all troughs are loaded with pots 42.

It is to be understood that different sized trays can be used together on a wall surface. For example, an eight trough tray can be positioned above a plurality of two trough trays. The combinations for placement vertically and horizontally on a wall surface are endless. One key advantage of the ability of interchange tray sizes relates to the differing propagation needs of specific plant varieties.

Figure 19:
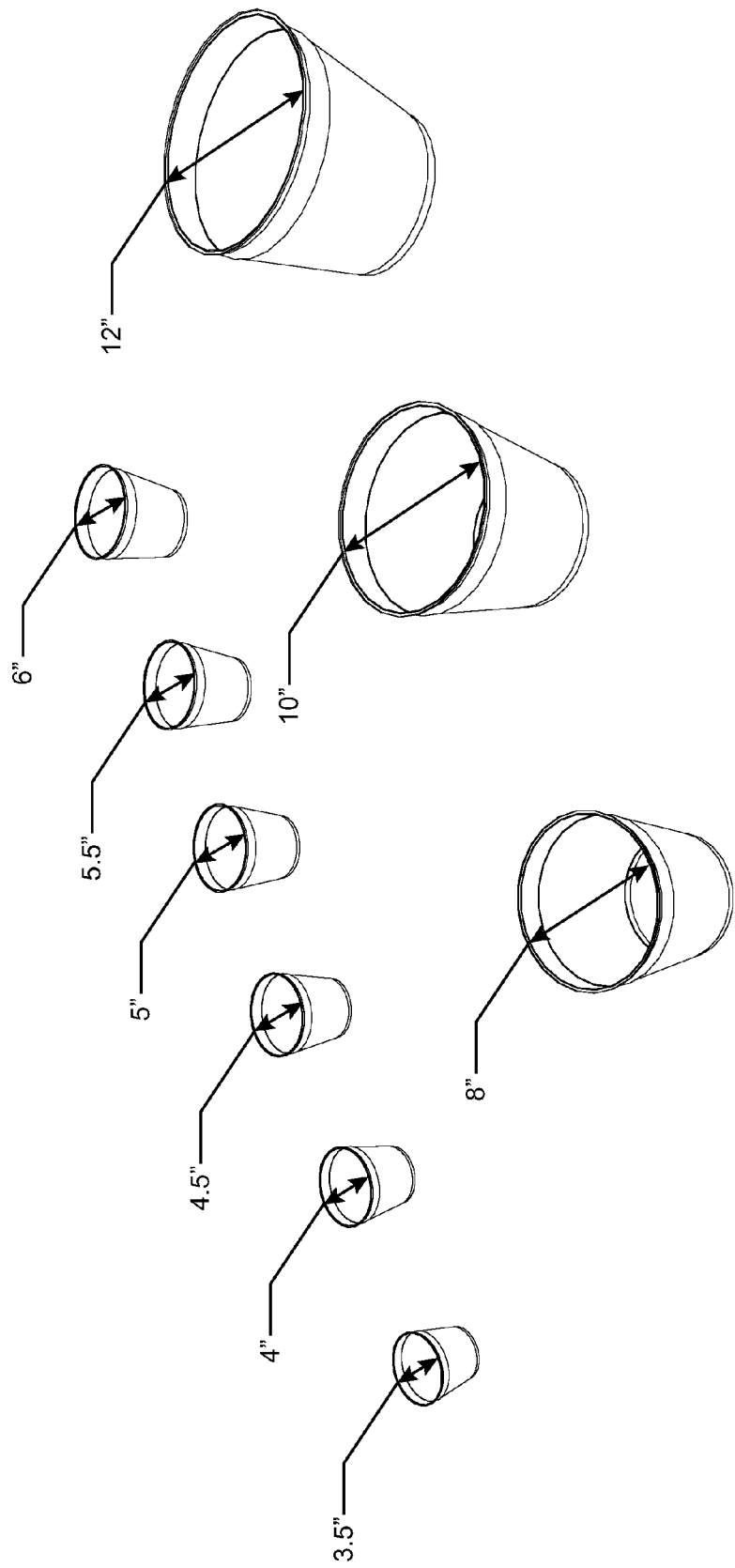
FIG. 19 is a depiction of various plant pot sizes which may be used in the tray of the present invention.

It is to be understood that plant pots of varying sizes can be "loaded" into the troughs of the plant trays. FIG. 19 illustrates various preferred pot diameters that range from 4" to 1 foot. This range is not intended to be limiting.

In one embodiment of the present invention, water supply can be specifically tailored to differing trays. A water supply line for each specific variety of plant can be installed to add water only to those trays with specific types of plants. Furthermore, water can then be diverted from those trays back into the drain lines before it cascades down into the plants below them. This allows watering to be controlled within the system on a per species basis. For example, a dry loving plant could be watered only once every two or three weeks, whereas a wet loving plant could be watered on a weekly basis. Wet loving plants would be situated in trays together and likewise dry loving plants would be separated in their own trays. Each plant could reside directly beside, below or above the other and yet have completely different watering schedules that would not conflict with the water requirements of the adjacent plant. This allows for a much higher level of plant health control and for the intermixing of unlike species together on the wall to achieve specific design or air quality goals.

In a preferred embodiment, each tray includes an irrigation line. In a further preferred embodiment, each tray includes a drainage line for egress of water to a second tray below the tray when in aligned arrangement on a wall surface.

In a preferred embodiment, the tray of the present invention is attached to a wall surface that is part of either a wall cabinet or built-in unit.

Trays 10 when not in use and for transportation efficiencies are fully nestable to facilitate ease of shipping and to decrease space requirements in shipping containers.

Components of tray 10 are constructed from suitable materials such as extruded plastics, aluminum, stainless steel, or other materials known in the art. Extruded plastics may further include one or more of additional additives for example, anti-microbials, antioxidants, antistatic agents, blowing agents, fragrances, biodegradable plasticizers, biostabilizers, external lubricants, fillers, extenders, flame retardants, heat stabilizers, impact modifiers, internal lubricants, light stabilizers, pigments, process aids, reinforcers, rubberizers, and any other additives known in the art. In one embodiment, the extruded plastics include a rubberizer to enable the plastic to maintain flexibility at cooler temperatures. The plastics materials may include one or more of polypropylene (PP), polyethylene (PE), polyethylene terephthalate (PET), polystyrene (PS), polyvinylchloride (PVC), polyfluoroethylene (PFE), polyurethane (PU), polytetrafluoroethylene (PTFE) and polycarbonate. Examples of suitable rubberizers include UV additives.

In one embodiment, at least one sensor is integrated into the tray 10. For example, a sensor may be used to detect at least one parameter in the plant growth environment, for example a physico-chemical condition in the growth environment or media within or near the plant pots. Preferably, this sensor detects, compiles, and analyzes data related to the at least one parameter in the plant growth environment. The sensor may, for example, include a temperature sensor or a moisture sensor (within the plant pots) or may include pH sensors and/or nutrient sensors selected for monitoring the media or growing environment In a preferred embodiment, the planter wall of trays further comprises a utility control system for the provision of at least one utility to the trays. The utility is selected from the group consisting of a heating line, electrical wire, a misting water supply line and combinations thereof.

In a preferred form, FIG. 24 illustrates differential water control, as between two water supply lines (#1 and #2) having respective drain lines (#1 and #2) and wherein plant species #1 and plant species #2 have differing watering requirements. By manipulating placement of the trays, applying such secondary water supply lines, the planting arrangement therein and via drain line diversions, it is possible to control water supply and volume to "sectors" of the tray stacks.

While embodiments of the present invention have been shown and described herein, it will be obvious to those skilled in the art that such embodiments are provided by way of example only. Numerous variations, changes, and substitutions will be obvious to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While the forms of elongate members, devices and the system described herein constitute preferred embodiments of this invention, it is to be understood that the invention is not limited to these precise forms. As will be apparent to those skilled in the art, the various embodiments described above can be combined to provide further embodiments. Aspects of the present device and system, and methods of use (including specific components thereof) can be modified, if necessary, to best employ the systems, methods, nodes and components and concepts of the invention. These aspects are considered fully within the scope of the invention as claimed. For example, the various methods described above may omit some acts, include other acts, and/or execute acts in a different order than set out in the illustrated embodiments. Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

What is claimed is:

1. A plant propagation and display tray, which is capable of interlocking alignment with at least one other tray and which is capable of receiving and holding at least one plant pot, comprises:
   a back wall and a bottom ledge forwardly projecting from said back wall;
   said ledge being inclined towards the back wall and comprising a plurality of alternating projections and troughs, each of said troughs inclining towards a trough point of abutment with the back wall and being of a conformation to securably hold one plant pot such that an open proximal end of the plant pot is exposed to view and a distal end of the plant pot is adjacent to the back wall;
   each of said projections having an upper surface which inclines towards a projection point of abutment with the back wall, wherein the projection point of abutment is higher than the trough point of abutment with the back wall;
   wherein said tray is capable of being attached to a wall surface; and
   wherein the back wall, on one side, comprises a substantially flat upper portion and a lower portion, adjacent the ledge, which is thicker than the upper portion and which is defined by a plurality of substantially V-shaped depressions, each of which points towards a trough on the ledge, and wherein the back wall, on the other side, is defined by a flat surface for alignment with a wall surface, when the tray is in use.

2. The tray of claim 1, which further comprises an irrigation line.

3. The tray of claim 1, which further comprises a drainage line for egress of water to a second tray below said tray when in aligned arrangement on a wall surface.

4. The tray of claim 1, which is shaped for nestable stacking with a plurality of plant trays.

5. The tray of claim 1 which comprises, on an upper edge of the back wall, a means for spaceable interconnection with an opposite means of interconnection on a lower edge of a back wall of a second tray which may be placed above said tray on a wall surface.

6. The tray of claim 5, wherein the means for spaceable interconnection includes a female member on the upper edge of the back wall and a male member on the lower edge of the back wall of the second tray wherein the interconnection of the female member of the tray and the male member of the second tray allow exact alignment of the trays on the wall and define a desired spacing between the trays.

7. The tray of claim 1, which comprises a mounting device for coupling said tray to the wall surface.

8. The tray of claim 1, wherein the wall surface is part of a wall cabinet.

9. The tray of claim 1, wherein the wall surface comprises part of a wall unit.

10. A planter wall formed of a plurality of interlocking trays as described in claim 1, one above another, and attached to the wall surface.

11. The planter wall of claim 10 which forms part of a wall cabinet.

12. The planter wall of claim 10 which forms part of a built-in wall unit.

13. The planter wall of claim 10, further comprising a utility control system for the provision of at least one utility to the trays.

14. The planter wall of claim 10, further comprising at least one utility selected from the group consisting of a heating line, an electrical wire, a misting water supply line, and combinations thereof.

15. The tray of claim 1, further comprising a second tray with a back wall having a lower edge, said tray being a first tray, said back wall of said first tray having an upper edge and having, on said upper edge, a means for spaceable interconnection with an opposite means of interconnection on said lower edge of said back wall of said second tray, said second tray being operable to be placed above said first tray on a wall surface.

16. The tray of claim 15, wherein:
the means for spaceable interconnection includes a female member on said upper edge of said back wall of said first tray and a male member on said lower edge of said back wall of said second tray; and
the interconnection of the female member of said first tray and the male member of said second tray allow exact alignment of the first and second trays on the wall and define a desired spacing between the first and second trays.

17. The tray of claim 1, further comprising a second tray with a back wall having a lower edge, said tray being a first tray, said back wall of said first tray having an upper edge and having, on said upper edge, a spaced interconnection device having an opposing interconnection device on said lower edge of said back wall of said second tray, said second tray being operable to be placed above said first tray on a wall surface.

18. The tray of claim 17, wherein:
the spaced interconnection device includes a female member on said upper edge of said back wall and a male member on said lower edge of said back wall of said second tray; and
the interconnection of the female member of said first tray and the male member of said second tray allow exact alignment of the first and second trays on the wall and define a desired spacing between the first and second trays.

19. The tray of claim 1, wherein the ledge comprises walls at each end.

20. A green wall system, comprising:
a plurality of interlocking trays, each interlocking tray comprising a plant propagation and display tray, which is capable of interlocking alignment with at least one other tray and which is capable of receiving and holding at least one plant pot, each interlocking tray comprising:
a back wall and a bottom ledge forwardly projecting from said back wall;
said ledge being inclined towards the back wall and comprising a plurality of alternating projections and troughs, each of said troughs inclining towards a trough point of abutment with the back wall and being of a conformation to securably hold one plant pot such that an open proximal end of the plant pot is exposed to view and a distal end of the plant pot is adjacent to the back wall;
each of said projections having an upper surface which inclines towards a projection point of abutment with the back wall, wherein the projection point of abutment is higher than the trough point of abutment with the back wall;
wherein said tray is capable of being attached to a wall surface;
a planter wall formed of the plurality of interlocking trays, one above another, and attached to the wall surface, the planter wall further comprising at least one utility selected from the group consisting of a heating line, an electrical wire, a misting water supply line, and combinations thereof.

21. The tray of claim 20, wherein the ledge comprises walls at each end.

22. The tray of claim 20, wherein the back wall, on one side, comprises a substantially flat upper portion and a lower portion, adjacent the ledge, which is thicker than the upper portion and which is defined by a plurality of substantially V-shaped depressions, each of which points towards a trough on the ledge, and wherein the back wall, on the other side, is defined by a flat surface for alignment with a wall surface, when the tray is in use.

23. The tray of claim 20, which further comprises an irrigation line.

24. The tray of claim 20, which further comprises a drainage line for egress of water to a second tray below said tray when in aligned arrangement on a wall surface.

25. The tray of claim 20, which is shaped for nestable stacking with a plurality of plant trays.

26. The tray of claim 20 which comprises, on an upper edge of the back wall, a means for spaceable interconnection with an opposite means of interconnection on a lower edge of a back wall of a second tray which may be placed above said tray on a wall surface.

27. The tray of claim 26, wherein the means for spaceable interconnection includes a female member on the upper edge of the back wall and a male member on the lower edge of the back wall of the second tray wherein the interconnection of the female member of the tray and the male member of the second tray allow exact alignment of the trays on the wall and define a desired spacing between the trays.

28. The tray of claim 20 which comprises a mounting device for coupling said tray to the wall surface.

29. The tray of claim 20, wherein the wall surface is part of a wall cabinet.

30. The tray of claim 20, wherein the wall surface comprises part of a wall unit.

31. The planter wall of claim 20 which forms part of a wall cabinet.

32. The planter wall of claim 20 which forms part of a built-in wall unit.

33. The planter wall of claim 20, further comprising a utility control system for the provision of at least one utility to the trays.

34. The tray of claim 20, further comprising a second tray with a back wall having a lower edge, said tray being a first tray, said back wall of said first tray having an upper edge and having, on said upper edge, a means for spaceable interconnection with an opposite means of interconnection on said lower edge of said back wall of said second tray, said second tray being operable to be placed above said first tray on a wall surface.

35. The tray of claim 34, wherein:
- the means for spaceable interconnection includes a female member on said upper edge of said back wall of said first tray and a male member on said lower edge of said back wall of said second tray; and
- the interconnection of the female member of said first tray and the male member of said second tray allow exact alignment of the first and second trays on the wall and define a desired spacing between the first and second trays.

36. The tray of claim 20, further comprising a second tray with a back wall having a lower edge, said tray being a first tray, said back wall of said first tray having an upper edge and having, on said upper edge, a spaced interconnection device having an opposing interconnection device on said lower edge of said back wall of said second tray, said second tray being operable to be placed above said first tray on a wall surface.

37. The tray of claim 36, wherein:
- the spaced interconnection device includes a female member on said upper edge of said back wall and a male member on said lower edge of said back wall of said second tray; and
- the interconnection of the female member of said first tray and the male member of said second tray allow exact alignment of the first and second trays on the wall and define a desired spacing between the first and second trays.

* * * * *